Aug. 7, 1962   O. G. MORIN   3,048,753
SERVO SYSTEM
Filed May 16, 1960   2 Sheets-Sheet 1
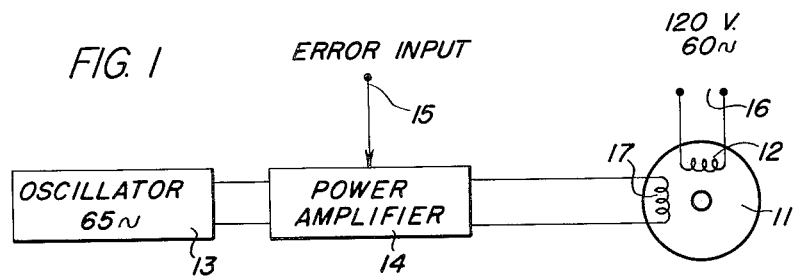
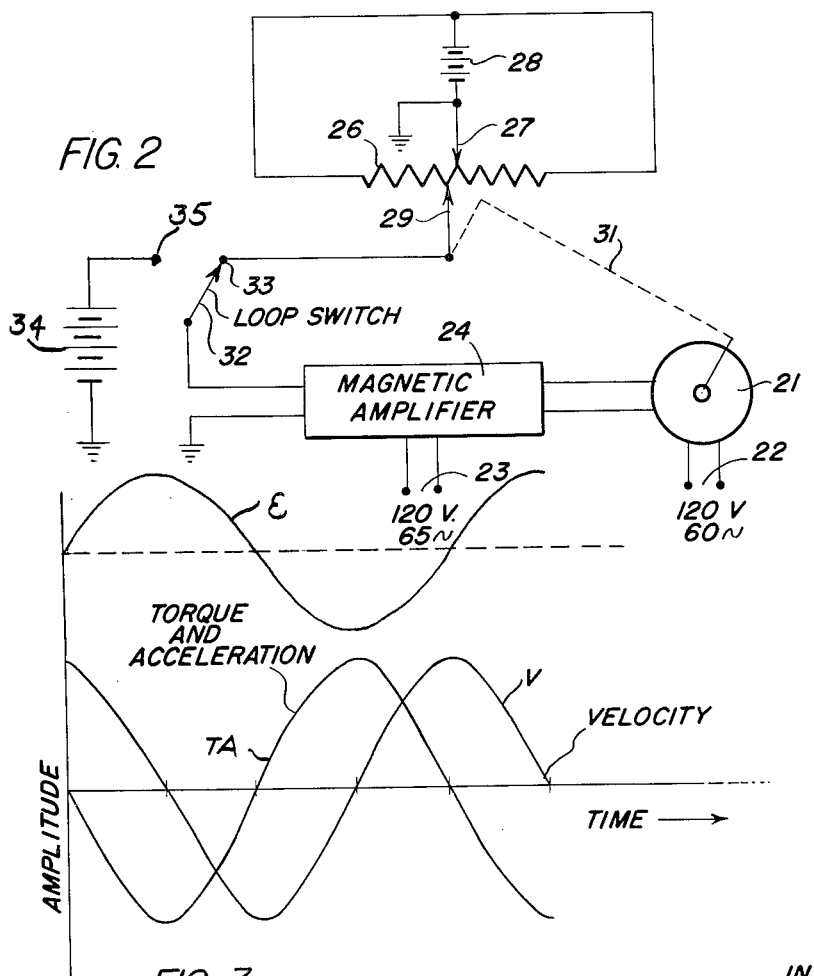
INVENTOR
OVIDE G. MORIN
BY Irwin P. Garfinkle
William Grobman
ATTORNEY INVENTOR.
OVIDE G MORIN.
BY Irwin P. Garfinkle
William Grobman
ATTORNEYS.

3,048,753
SERVO SYSTEM
Ovide G. Morin, Nashua, N.H., assignor to Avco Corporation, Cincinnati, Ohio, a corporation of Delaware
Filed May 16, 1960, Ser. No. 29,316
9 Claims. (Cl. 318—28)

This invention relates to servomechanisms and, more particularly, to servo systems in which the error signal contains no phase or direction information.

Basically this invention involves a servo system operable on error magnitude data only, and it is equally adaptable to electronic, electro-mechanical, or mechanical systems.

In certain servo applications, direction information is sometimes not obtainable from the error detector. For example, in phasing in two sources of microwave electrical energy, the error, whether one source is leading or lagging as indicated by means of a crystal detector, changes in magnitude only but not in direction. In such a system, therefore, it is necessary to eliminate the error without benefit of direction information. Manually this could be accomplished by an operator adjusting the phase of one source and noting whether or not the error increases or decreases. With an increase in error he would reverse the direction of adjustment until a null is reached. This invention seeks to accomplish the same results automatically. As will be seen, a unique second order servo system, as described herein, is capable of producing the required result.

Ordinarily a servo in which the error signal contains no phase or direction information could be in either a stable or unstable state, depending upon whether the amplitude of the error signal is decreasing or increasing during a given direction of motion of the output member. In the usual servo system the correct direction of motion of the output member is obtained from the polarity of the error signals, and the system is correctly phased when the polarity of the error signals causes motion of the output member in that direction which reduces the magnitude of the error signal. Where the error signal provides only magnitude information about the system error then, depending upon the way in which the system is phased, the motion of the output member could cause either an increase or a decrease in the error signal. If this motion happens to be in the direction which causes an increase in the error signal, then the system is said to be in positive feedback state. If the system is phased so that the motion of the output member causes a reduction in the error signal, then the system is said to be in negative feedback, a state in which the possibility of stability exists.

If, under a particular set of conditions, the system is in a negative feedback state and motion of the output member is causing a reduction of the error signal toward the null, then upon reaching the null the error signal will be zero; but the inertia of the system will invariably carry the output member beyond the null, causing a reversal of the system error. The error signal, being incapable of reversing its polarity, will then cause continued motion of the output member in the same original direction, but this time with an increase in the error signal. Therefore, stability is not possible in the ordinary system when the error signal does not reverse polarity along with the system error.

If the error signal cannot reverse its polarity as the system error passes through the null, then a stable system can be realized if the phasing of the system is caused to reverse precisely as the error passes through the null. Thus, if the output member is approaching and passing through the null under the action of a decreasing error signal, and if the phasing of the system is reversed as the inertia of the system carries the output member through the null, then the system can be maintained in a negative feedback state. However, in many applications it is desirable that a system should eventually come to rest with zero error, and such a result is not possible with a system that reverses polarity at the null since continuous sampling of the error is required.

While system phase reversal is necessary for stability if the error signal does not contain phase information, this invention embodies the realization that if these phase reversals have no relationship to the phase condition of the system, a feedback control system with inherent stability and simplicity results. That is to say, this invention deals with a system in which the phase is arbitrarily reversed at regular intervals that are unrelated to whether or not the output member is passing through the null. Indeed if a sizeable error exists in the system the phase may be reversed several times before the system reaches the null. It has been demonstrated that such a system seeks a null if the system contains two integrations with respect to time between the error signal and motion of the output member. Mechanical systems inherently contain the required integrations by virtue of inertia in the output member, and double integration is easily obtained in electrical or electronic systems. Thus, this invention is applicable to any feedback control system wherein a phase-sensitive error detector is not available. Such detectors arise in systems which measure such output quantities as heat, or temperature, light intensity, sound intensity, etc. These quantities have a common property of not being physically realizable in negative amounts.

In actual operating condition, the system phase is reversed rapidly enough so that the excursion of the output member during the positive feedback intervals is limited to an acceptable amount, depending upon the particular system application. At the same time, the phase must be reversed slowly enough so that the output member can acquire some net displacement during each positive and negative feedback interval.

There are numerous methods whereby the phase of a control system may be reversed. Usual control systems contain at least the following devices: (1) an error detector which measures the difference between a condition in the output system and a desired condition; (2) a controller which converts the error signal to a form which is acceptable to the output device; and (3) an output device which controls the system output member with power supplied from an external source and regulates the amount of this power applied according to the magnitude of the error and regulates the direction in which the power is applied according to that required to bring about a reduction in the system error. The phase condition of an entire system depends upon the phase relationship existing between the input and output of each of the devices listed above. Phase reversal, as required by this invention, may be obtained by reversing the phase relationship between the input and output of any one of the above devices. For example, if the output device produces a torque in a particular direction when a special signal is applied at the input, then a phase reversal would require a torque in the opposite direction for the same input signal. This invention required a continual reversal of phase in any one of the above devices.

In one illustrated embodiment of this invention I utilize a two-phase induction-type servo motor which is energized by first and second sources having different frequencies. Motion is ordinarily imparted to the rotor of a two-phase induction motor by applying currents of one frequency to both the reference winding and the control winding, but displaced by 90 degrees. In accordance with this invention, however, the control winding is provided with currents of a slightly different frequency so as to cause an oscillatory motion of the rotor. For example, the first source may energize a reference winding at a frequency of 60 cycles and the second source may energize a control winding at 65 cycles. As will be readily understood by those skilled in the art, this will cause the servo motor to oscillate sinusoidally at the difference frequency of 5 cycles per second. Now if the rotor of the motor is coupled to the slide tap in an error-producing network, it will be seen that the oscillating motor produces the function of modulating the error signal. Also, if the second source is applied to the control windings of the servo motor through a regulator, the torque of the servo motor oscillations can be varied by adjusting the regulator. As will be seen, if the regulator is controlled in accordance with the magnitude of the error signal, then the servo motor will oscillate with a net resultant movement in the direction toward a null, the motor itself producing the required integration and time delay in accordance with known principles.

It is an object of this invention to provide a new type of feedback control system not requiring direction information in the error signal.

It is another object of this invention to provide an improved servo system in which the error signal, as it is generated, is not required to contain direction information.

Another object of this invention is to provide a null-seeking servo system in which the phase of the servo gain is continuously reversed, and to provide means for sensing the direction of action to reduce the error.

Further objects and advantages and a more complete understanding of the precise nature of this invention will become apparent from the following description, taken together with the accompanying drawings, in which:

FIG. 1 is a block diagram of an electrical servo system illustrating the principles of operation of this invention;

FIG. 2 is a circuit diagram partially schematic and partially in block, illustrating one embodiment of this invention as incorporated in an electro-mechanical servo system;

Figure 5:
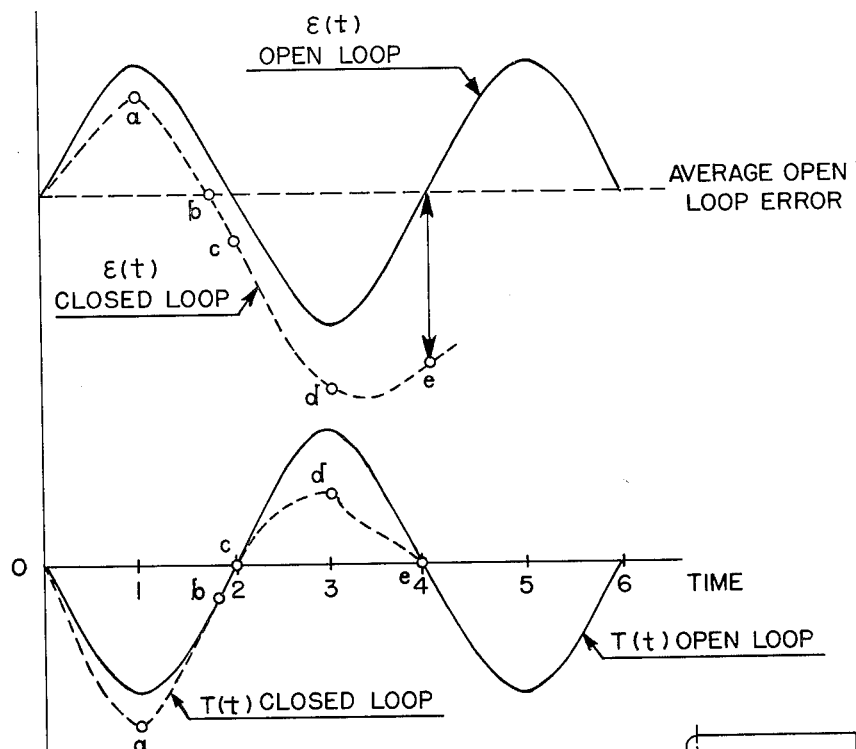
Figure 4:
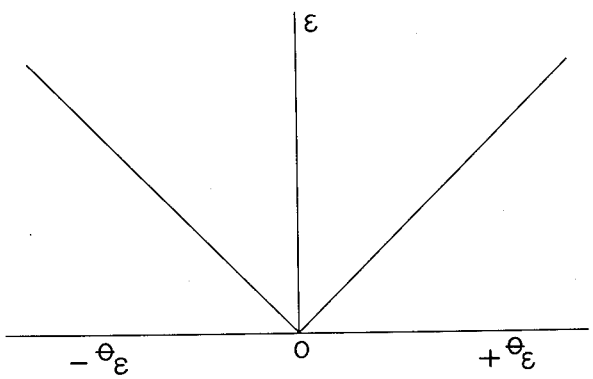
Figure 6:
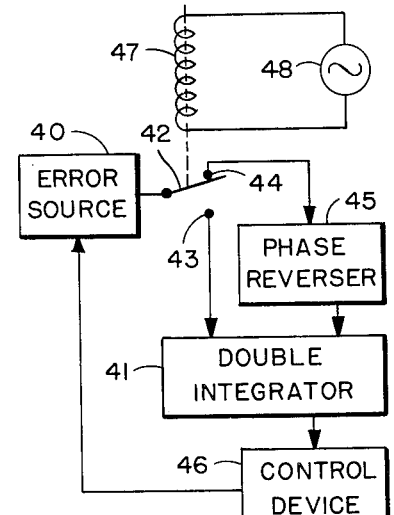

FIGS. 3, 4, and 5 represent the system variables plotted as a function of time; and FIG. 6 represents a generic embodiment of this invention.

For the purpose of demonstrating certain principles of this invention, there is shown in FIG. 1 an electrical two-phase induction-type servo motor 11, its reference winding 12 being energized from a first or reference source of 60-cycle energy applied to terminals 16 and its control winding 17 being energized by 65-cycle energy from a controllable reference or second source, including a local oscillator 13 supplying the 65-cycle energy to a power amplifier 14. The power amplifier 14 has an input terminal 15 by which an error signal may be applied to control the output of the power ampifier. The power amplifier 14 is designed so that its 65-cycle output decreases as the error decreases and is zero with no error signal applied.

Normally the two windings of a servo motor would be energized from sources of the same frequency, but which are 90 degrees out of phase. In accordance with the principles of this invention, however, the reference and control windings are energized from sources of different frequencies, and it has been found that a sinusoidal torque is developed by the rotary member at a speed equivalent to the frequency difference between the two sources. Thus, the rotor of the motor 11 in FIG. 1 oscillates at a rate of 5 cycles per second in a sinusoidal fashion when energized from the two sources at 60 cycles and 65 cycles, respectively.

An error signal applied at the input terminal 15 to the power amplifier 14 throttles the amplifier 14 and thereby regulates the flow of 65-cycle current therethrough. This means that instantaneous variation in error provides instantaneous control over the torque developed by the rotor of the motor 11. It also means that the torque of the motor reverses at a rate of 5 cycles per second, a rate independent of the polarity of the error signal. If the error signal applied to input terminal 15 is decreased to zero there is no output from the amplifier 14, and the motor 11 will not oscillate.

Considering the effect of such torque, it becomes evident that the application of sinusoidal energy of two different frequencies to the two torque-producing members of any servo motor will result in an oscillation of its rotary moving parts at a frequency which is the difference of the two input signals. It is, of course, understood that this difference in frequency need not be 5 cycles per second but can be any convenient value. As will be further explained, the inherent reversals of the motor and the dependence of torque on the instantaneous error can be used to obtain a net motion toward a null in a closed servo loop.

From the foregoing analysis of FIG. 1 it may be observed that the torque developed by the motor is proportional to the control winding voltage and to the sine of the difference frequency. Letting the difference frequency, i.e., the difference in frequency between the oscillator 13 and the 60-cycle source, be called the modulation frequency and denoting it by the term $\omega_m$, the torque developed in the servo motor is characterized by the following equation:

$$T_D = K_T E_C \sin \omega_m t$$

where $T_D$ = torque developed by motor;
$E_C$ = R.M.S. control field voltage; and
$K_T$ = torque constant of motor.

Thus, the motor torque is positive or negative according to the sign of sine $\omega_m t$. It results that sinusoidal motion of the rotor always implies sinusoidal torque, since for simple harmonic motion the velocity and acceleration are completely defined when the position is specified.

In the embodiment described herein, the above torque characteristic of a two-phase motor is utilized with provision for varying the amplitude of the control winding excitation in proportion to the magnitude of an error signal. Thus, in accordance with this invention, torque is developed as follows:

$$T_D = K \epsilon \sin \omega_m t$$

where $\epsilon$ = absolute value of the servomechanism error signal;
$K$ = proportionality constant referred to as the system gain constant; and
$T_D$ and $\omega_m$ remain as previously defined above.

Thus, referring again to FIG. 1 and assuming for simplicity that the direct current error input signal $\epsilon$ is available at 15, then the output from the power amplifier is proportional to the error signal. To effect control of the error and to reduce it to zero, the motor must be coupled to the function under control and a suitable error detector provided to complete the feedback loop. Such a system is diagrammatically illustrated in FIG. 2, to which reference should now be made.

A two-phase electrical servo motor 21 is fed through input terminals 22 from a source of reference power of 120 volts and 60 cycles, for example. The control winding of the motor 21 is energized through a magnetic amplifier 24 which regulates the control power supplied to the control winding from a suitable source of 65-cycle, 120-volt energy through input terminals 23. The magnetic amplifier 24 is, in turn, controlled by the error signal which, for the purpose of this description, is generated in a potentiometer 26 having an adjustable tap 27 and a slide contact 29. A source of substantially constant direct energy, such as battery 28, is connected between the two ends of the potentiometer 26 and the adjustable tap 27. The slide contact 29 has applied between it and ground a potential which varies in amplitude in dependence upon the position of the slide contact 29 with respect to the variable tap 27. It is to be understood, however, that any error source having characteristics such as illustrated in FIG. 4 is contemplated by the invention. That is to say, this invention is most useful in conjunction with an error signal having characteristics wherein no direction information is available.

It can be seen that the potentiometer arrangement of FIG. 2 is such that the tap 27 is always negative with respect to either end of the potentiometer 26, and it does not matter which side of the tap 27 the slide contact 29 is on and, thus, no direction signal is derived therefrom. The tap 27 may serve as an error-producing device which, in actual practice, may be a conductive photocell, a thermocouple, or some other sensing member which modifies the current flowing through the slide contact 27. In a system as actually reduced to practice, the error signal was produced by a radio frequency diode detector which indicated the intensity of microwave energy. The potential difference between tap 27 and slide contact 29 is applied through a fixed contact 33 and a movable contact 32 of a loop switch to the power amplifier 24 to control the current flow therethrough. A battery 34, one terminal of which is grounded and the other terminal of which is connected to a fixed contact 35, is provided for a purpose hereinafter to be explained.

In operation, when power is applied from terminals 22 and also through the power amplifier 24 from terminals 23, a sinusoidal torque is developed by the rotor of the motor 21 at a frequency of 5 cycles per second. This causes excursions of the rotor of the motor 21 first in one direction and then in the opposite direction resulting in a net movement of the slide contact 29 toward the tap 27.

Reference is now made to FIGS. 3, 4, and 5 in which the dynamic relationships of torque, velocity, position, and error are illustrated. If it is assumed that an error $\theta_\epsilon$ exists and gives rise to an error signal $\epsilon$ in accordance with the curve in FIG. 4, then if the error signal $\epsilon$ is used to control the voltage delivered to the control winding of the servo motor 21, the rotor of the motor 21 will be oscillated sinusoidally with a torque proportional to the error signal $\epsilon$. Since the motor is coupled by the shaft 31 to the slide contact 29, it is seen that the error signal will be modulated sinusoidally. Since the modulations of the error signals are returned to the amplifier 24, the control loop is completed and the shaft 31 will be oscillated with a net resultant movement toward a null.

For the purpose of analyzing the foregoing results, assume that the feedback loop is broken by moving the loop switch 32 from the contact 33 to the contact 35. This, in effect, substitutes the battery 34 for the error signal and, thus, sinusoidal variations in the position of the slide contact will result without affecting the average value of the error signal now produced by the battery 34. If the voltage of the battery 34 is adjusted so that it is equal to the average value of the error signal $\epsilon$, and if the gain of the power amplifier is adjusted so that the peak value of the sinusoidal component of the error signal is less than its average value, then it is possible to sketch the variation of the error signal as a function of time, as shown by the curve $\epsilon$ in FIG. 3.

The instantaneous velocity and acceleration of the slide contact 29 can be obtained by differentiation of the error signals as a function of time. From elementary mechanics it is known that torque and acceleration are linearly related so that the acceleration curve can be regarded as describing the torque developed in the motor as a function of time. The velocity function is represented by the curve V while the torque and acceleration functions are represented by the curve TA in FIG. 3. Notice that the torque-acceleration curve TA is 180 degrees out of phase with the variation in error $\epsilon$.

Now if the loop switch 32 is returned to the contact 33 the torque curve is no longer a simple sinusoidal function of time, but varies in proportion to the instantaneous error as indicated by the previously developed equation:

$$T_D = K\epsilon \sin \omega_m t$$

The function of closed loop operation may be understood by reference to FIG. 5 wherein the error and torque curves in the open loop condition are represented in solid lines and wherein the error and torque curves in the closed loop condition are indicated in dotted lines.

Assume that the switch 32 is returned to the contact 33 at time $t=0$ in FIG. 5. At this instant it will be seen that the error is becoming greater than the open loop average value. This means that the amplitude of the torque is becoming greater than the open loop value, since torque is a function of the error. Suppose that at time $t=1$ the effect of the increased error signal is to increase the torque to a new value at point $a$ on the dotted curve. Up to this point the torque is opposite to the velocity of the slide contact 29 and, thus, the excursion of the slide contact is reduced and reaches a new smaller maximum point on the dotted curve at $a$. Since the torque remains negative and instantaneously greater than the open loop value, the motion of the wiper is reversed until the point $b$ is reached, when the torque remains negative until point $c$ is reached; and by this time the wiper has acquired a velocity which exceeds the velocity for the open loop and is in a direction to reduce the error. The polarity of the torque is now reversed to oppose the velocity of the wiper toward the zero error position, but this error is now less than the open loop value, so the reversing torque is less and thus reaches a maximum value at point $d$. The wiper is eventually reversed by the small positive torque and the error increases to point $e$. When point $e$ has been reached, one cycle of the modulation frequency has been completed.

Continued analysis of the next cycle starting at the point $e$ reveals that the torque will continuously be reduced while the error signal is also reduced toward a null. Note that because the torque is proportional to the error and is varied sinusoidally by an externally controlled modulation frequency, certain non-linearities are introduced which result in a net reduction in the error for each cycle of the modulation signal. The polarity of the error signal is immaterial because the torque is automatically reversed at regular intervals at the modulation frequency.

Notice also that the polarity of the torque is reversed without an accompanying reversal of the error signal polarity. This is equivalent to changing the polarity of the feedback every half-cycle. That is to say, for one half-cycle of the modulation frequency the control system has negative feedback tending to drive the slide contact 29 toward the null, but on the other half-cycle has positive feedback tending to drive the slide contact 29 from the null. Because the driving force is approximately 180 degrees out of phase with the position, the excursion during the negative feedback interval is also greater than the excursion during the positive feedback interval and, therefore, a drift toward the null is superimposed upon the periodic motion caused by the modulation.

Referring now to FIG. 6 of the drawings, the principles of this invention are incorporated diagrammatically in an embodiment of this invention which may be considered generic. In this embodiment there is illustrated a controllable error source 40 having an output response of the nature illustrated in FIG. 4. That is to say, the output of the controllable error source 40 will always be of a given polarity or phase, irrespective of the direction of the error. The output from the controllable error source is applied to a double integrator 41 alternately through first and second paths. The first path is direct to the double integrator 41 through switch arm 42 and a contact 43, and the second path is through the switch arm 42 and a contact 44 and through a phase or polarity reverser 45. The output from the double integrator 41 is then applied to any suitable control device 46 which, in turn, controls the error source. The first and second paths to the integrator 41 are alternately established by vibrating the switch arm 42 between the contacts 43 and 44 at a uniform rate by means of relay winding 47 energized from any suitable alternating current source 48.

In operation, when an error exists, an output signal of a given polarity or phase is produced by the controllable error source 40. This output signal is then changed in polarity or phase during one-half of the total time of operation due to the fact that the switch arm 42 is moving at a uniform rate between the contacts 43 and 44 under the influence of the relay 47. Thereafter, the output signal is modified by the phase reversal and is then double integrated in the double integrator 41. In accordance with known servo techniques, the output from the double integrator 41 is then applied to the control device 46 for the purpose of eliminating the error and producing a zero output signal.

As will be understood from the foregoing discussions, the phase reverser 45 and the relay 47 with the associated contacts may be located between any of the three elements in the servo loop. That is to say, it is not necessary to reverse the phase of the error signal to achieve the necessary nulling, but it is necessary to reverse the phase or polarity of the gain of the servo loop. In effect, what is accomplished here, as in the embodiment of FIG. 2, is the introduction of both positive and negative feedback in the servo loop, the inherent action of the integrator being such as to produce the desired nulling.

In summary, this invention is characterized in that positive feedback, an unstabilizing condition, is deliberately used during part of the nulling time to bring about system stability. The double integration with respect to time causes the motion away from the null during each positive feedback interval to be less than the motion toward the null during each negative feedback interval. The result is that the output member will drift toward the null with a superimposed oscillatory motion. However, upon reaching the null, the phase of the system continues to be reversed at regular intervals, irrespective of whether an error exists. This system has the ability to maintain a condition of rest since, if no error exists, reversal of system phase cannot produce motion. Moreover, it should be understood that operation of the servo motor in the manner described above fulfills the requirement of a phase reversal which is independent of the control signal. Other methods are available. For example, the control signal could have been modulated by a synchronous modulator at a frequency differing from the reference voltage on the motor and applied to the motor after linear power amplification in a conventional electronic amplifier.

In designing any servo system of this nature it must be borne in mind that successful operation will be dependent upon the relationship of the natural loop frequency of the servo to the modulation frequency, and the modulation frequency must always be greater than the natural loop frequency. In actual operation of the embodiment of FIG. 2, optimum performance resulted when the modulation frequency was from three to six times the natural loop frequency. In other systems, particularly in an entirely electronic system, it was found that optimum performance resulted when the modulation frequency was as much as ten times the natural loop frequency.

It is understood that this specification may indicate to those skilled in the art other forms of utilizing the principles of the invention described herein, and it is, therefore, intended that this invention be limited only by the scope of the appended claims.

What is claimed is:

1. A servo loop including a source of error signals having an error output which is insensitive to direction of error; a control device for controlling the magnitude of said error signals; double integrating means between said source and said control device; and means for alternately reversing the polarity of the gain of said servo loop, whereby said servo loop automatically eliminates said error output.

2. In a servo loop, the combination comprising: a source of direct current error signals having an output which is insensitive to direction of error; drive means coupled to said source for controlling the magnitude of said error signals; control means coupled to said drive means for regulating the power output of said drive means, said control means being responsive to the magnitude of said error signals; means for alternately reversing the polarity of the gain of said servo loop; and double integrating means in said loop.

3. The invention as defined in claim 2, wherein said drive means is the rotor of a two-phase induction motor; and wherein said means for alternately reversing the polarity of the gain of said servo loop includes means for supplying one phase of said induction motor with currents of one frequency and the other phase of said induction motor with currents of a second frequency whereby the rotor of said motor oscillates; and wherein said double integrating means in said loop is provided by the inertia of said motor; and wherein said control means controls the level of energy supplied to one of said phases.

4. A servo system comprising: a two-phase servo motor having a first phase input and a second phase input; a first energy source connected to said first phase input to supply thereto alternating energy of a first frequency; a gate circuit connected to said second phase input; a second source of energy connected to the input of said gate circuit to supply thereto alternating energy of a second frequency to said servo motor to oscillate slightly at a rate equal to the difference between the frequencies of said first and second energies; means for controlling said gate circuit; and means connected from the output of said motor to said means for controlling said gate circuit to cause said gate circuit control means to provide said gate circuit with an alternating control signal having a frequency equal to the rate of oscillation of said motor.

5. A servo system comprising: a servo motor which requires two separate input signals to develop torque; a first input to said servo motor; a second input to said servo motor; means for connecting a first source of alternating energy to said first input; valve means connected to said second input; means for connecting a second source of alternating energy to said valve means, the energy of said first and second sources alternating at different frequencies; means for controlling said valve means for determining the amount of energy passing therethrough to said second input, said control means comprising a source of substantially constant control energy connected to said control means; means for balancing said control energy to effectively nullify it; and means connected to said motor output for modifying said control energy whereby an unbalance between said control energy and said control energy balancing means causes said valve means to allow energy from said second source to be applied to said second input, causing said motor to vibrate at a frequency which is the difference between the frequencies of the energies of said first and second sources and to thus modify said control energy at said difference frequency, the variation of said control energy serving to modulate the energy from said second source in said valve means.

6. An electrical servo system comprising: a two-phase servo motor having a first phase input and a second phase input; means for connecting a source of alternating energy of a first frequency to said first phase input; gate modulator means having its output connected to said second phase input and its input connected to a second source of alternating energy of a second frequency; a control circuit connected to said gate modulator means for determining the flow of energy from said second source to said second phase input, said control circuit comprising a source of direct energy, variable resistor means having a slide contact and an adjustable tap; means for connecting one end of said source of direct energy to said adjustable tap and for connecting the other end of said source of direct energy to the two ends of said resistor; means for electrically connecting said tap and said slide contact to said gate modulator means to supply thereto a control potential proportional to the resistance between said tap and said slide contact; and means for mechanically coupling said slide contact to said motor to be moved as said motor rotates.

7. The servo system defined in claim 6, wherein said gate modulator means comprises a magnetic amplifier.

8. The servo system defined in claim 6 further including means for mechanically connecting said tap to an external device for positioning said tape in response to an external condition.

9. A servo system comprising: a servo motor having a first input and a second input; means for applying a first signal having a first frequency of oscillation to said first input; means for supplying a second signal having a second frequency of oscillation to said second input; means responsive to an external condition for determining the amount of said second signal applied to said second input; and means connected to said motor for balancing the effect of said external condition to reduce the second signal at said second input to substantially zero.

References Cited in the file of this patent

UNITED STATES PATENTS

| | | |
|---|---|---|
| 1,999,646 | Wittkuhns | Apr. 30, 1935 |
| 2,385,481 | Wills | Sept. 25, 1945 |
| 2,404,891 | Schmitt | July 30, 1946 |
| 2,460,638 | Gilbert | Feb. 1, 1949 |
| 2,532,723 | Knoop | Dec. 5, 1950 |
| 2,688,112 | Wimberly | Aug. 31, 1954 |

OTHER REFERENCES

Cage and Bache: Theory and Application of Industrial Electronics, page 86, McGraw-Hill, New York, 1951.

UNITED STATES PATENT OFFICE
CERTIFICATE OF CORRECTION

Patent No. 3,048,753                                          August 7, 1962

Ovide G. Morin

It is hereby certified that error appears in the above numbered patent requiring correction and that the said Letters Patent should read as corrected below.

Column 8, line 34, before "said" insert -- cause --; column 9, line 18, for "tape" read -- tap --.

Signed and sealed this 20th day of November 1962.

(SEAL)
Attest:

ERNEST W. SWIDER
Attesting Officer

DAVID L. LADD
Commissioner of Patents